July 25, 1933.                 H. J. STEHLI                    1,920,024
                          INTEGRATING MECHANISM
                 Original Filed Dec. 18, 1928     2 Sheets-Sheet 1

Henry J. Stehli
    INVENTOR.
BY Austin & Dix
    ATTORNEYS.

July 25, 1933. H. J. STEHLI 1,920,024
INTEGRATING MECHANISM
Original Filed Dec. 18, 1928 2 Sheets-Sheet 2

Henry J. Stehli
INVENTOR.

BY
ATTORNEYS.

Patented July 25, 1933

1,920,024

UNITED STATES PATENT OFFICE

HENRY J. STEHLI, OF CEDAR GROVE, NEW JERSEY, ASSIGNOR TO SINTERING MACHINERY CORPORATION, OF NETCONG, NEW JERSEY, A CORPORATION OF NEW JERSEY

INTEGRATING MECHANISM

Original application filed December 18, 1928, Serial No. 326,825. Divided and this application filed April 26, 1932. Serial No. 607,529.

This invention relates to apparatus for integrating two variables, and more particularly to a mechanism for continuously integrating the weight of material transported on a traveling belt.

The invention provides a friction cone which is driven at a speed proportional to one of the variables, and a tiltable wheel driven by frictional contact with the face of said cone and movable longitudinally thereof in accordance with the instantaneous value of the second variable. For example, when used to measure the weight of material transported by a belt conveyor, the cone is driven at a speed proportional to the speed of the belt, while the position of the tiltable wheel longitudinally of the surface of the cone is determined by the instantaneous load on that portion of the belt supported by scale levers. The speed of the tilting wheel is accordingly proportional to both the speed of the belt and the weight of the material thereon. A differential mechanism is employed consisting of two gears which are driven in opposite directions by the friction cone and by the tiltable wheel respectively. The position of the tiltable wheel when no load is being conveyed is adjusted so as to exactly neutralize the movement of the differential caused by the rotating cone. For any other position of the tiltable wheel a differential movement is obtained which is transmitted to a registering apparatus.

A feature of the invention is the location of the friction cone with one of its faces substantially horizontal whereby the friction of the tiltable wheel thereon may be maintained substantially constant.

Another feature is the provision of a friction cone with its axis suitably positioned to permit connection to the differential and to a belt pulley.

The invention also consists in certain new and original features of construction and combinations of parts hereinafter set forth and claimed.

Although the novel features which are believed to be characteristic of this invention will be particularly pointed out in the claims appended hereto, the invention itself, as to its objects and advantages, the mode of its operation and the manner of its organization may be better understood by referring to the following description taken in connection with the accompanying drawings forming a part thereof, in which Fig. 1 is a diagrammatic representation of a traveling belt and the integrating mechanism showing the relative locations thereof;

Like reference characters denote like parts in the several figures of the drawings.

Figure 1:
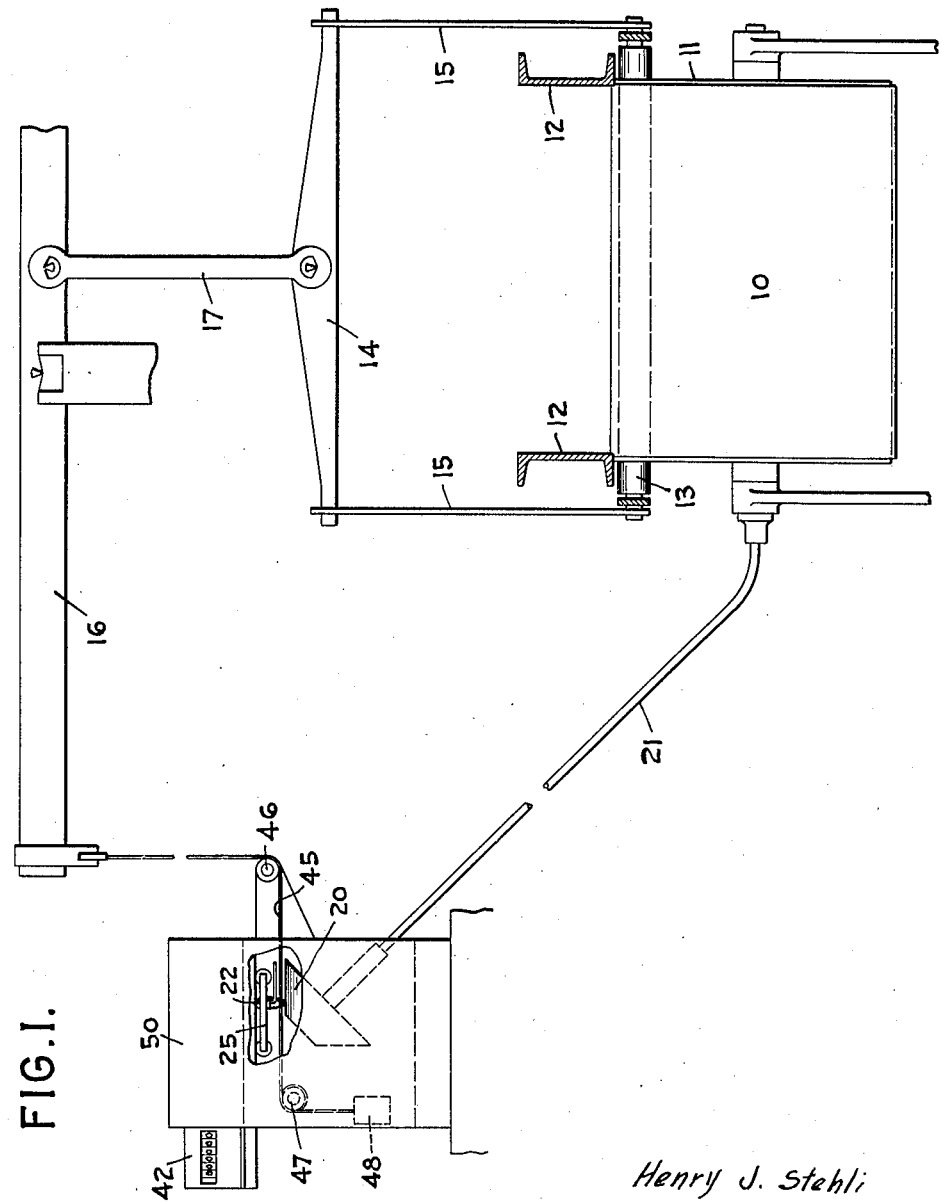

In the following description and in the claims parts will be identified by specific names for convenience, but they are intended to be as generic in their application to similar parts as the art will permit.

For illustration the invention is shown in connection with the weighing of material passing over a continuous belt conveyor.

Referring to the drawings more in detail, the invention is shown as applied to a continuous belt 10 which is passed around a suitable end pulley 11. A movable support including roller 13 is positioned underneath said belt intermediate the ends thereof and is supported from yoke 14 by means of links 15. This support and the portion of the belt passing thereover constitute a weighing platform. Yoke 14 is in turn supported from weighing beam 16 by means of link 17. The particular form of weighing platform and mechanism for applying force therefrom to the weighing beam 16 form no part of the present invention and have accordingly not been set forth in detail.

Figure 2:
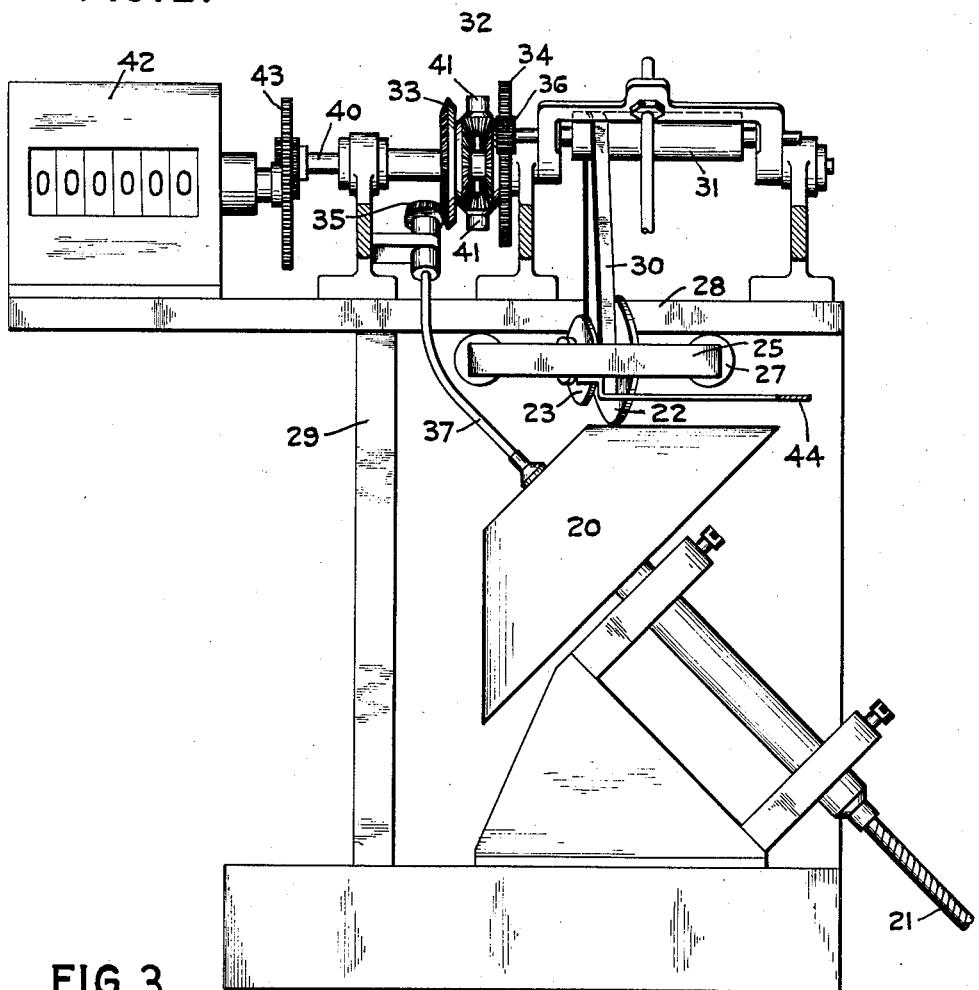
Fig. 2 is an enlarged detail view of the integrating mechanism.

The integrating mechanism which is shown more in detail in Fig. 2 includes a friction cone 20 which is mounted with its axis extending at substantially 45° to the horizontal whereby it may be connected by a flexible cable 21 to a suitable pulley over which belt 10 is traveling, for example, pulley 11. Friction cone 20 is preferably positioned so that its upper surface extends in substantially a horizontal direction for a purpose to be described, and is provided with a suitable facing of friction material.

Figure 3:
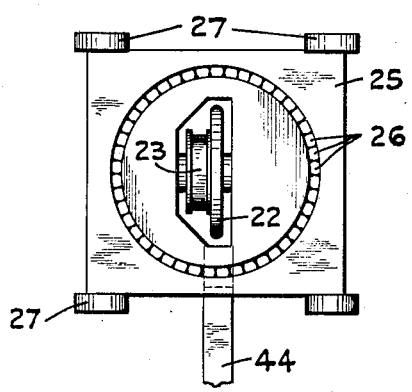
Fig. 3 is a plan view of the tiltable wheel and frame therefor.

Tilting wheel 22 having a belt pulley 23 (Fig. 3) associated therewith is journalled for rotation in bearing member 24. Said member 24 is likewise journalled for rotation in frame 25, ball bearings 26 being provided to facilitate movement thereof. Frame 25 is provided with wheels 27 which bear against ways 28 for holding the tilting wheel 22 in contact with the upper horizontal surface of cone 20. Ways 28 are supported by a frame work 29 in any desired manner and are so constructed as to permit horizontal movement of frame 25 longitudinally of said cone over the entire upper surface thereof. Belt 30 cooperates with pulley 23 and with drum 31, and is adapted to slide along the surface of said drum in accordance with the movement of frame 25.

Differential mechanism 32 includes a pair of main gear wheels 33 and 34 which are driven by cone 20 and drum 31 respectively through gears 35 and 36. Gear 35 is driven by a flexible cable 37 which is secured to cone 20 and is rotated thereby. Shaft 40 carries pinions 41 forming a part of the differential mechanism 32 of well known construction and drives counter or registering mechanism 42 through a suitable set of gears 43.

Tilting lever 44 is secured to bearing member 24 in any desired manner and serves to determine the angular position of said bearing member in frame 25. Said lever 44 is connected at its free end to a flexible tape such as a steel ribbon 45, said ribbon being passed over pulleys 46 and 47 and held in operative condition by means of weight 48. The free end of ribbon 45 is secured to weighing beam 16 in any desired manner. Casing 50 surrounds the entire apparatus with the exception of registering device 42 thereby protecting the apparatus from injury and preventing unauthorized changes in the adjustment.

In the operation of the device above described, cone 20 is driven through flexible cable 21 in accordance with the speed of the conveyor belt 10. Said cone also drives gear 33 at a corresponding speed. The instantaneous position of weighing beam 16 is determined by the weight of material on the portion of the belt supported by weighing platform 13. Movement of beam 16 is transferred by flexible ribbon 45 to lever 44 and thereby determines the angular position of the axis of wheel 22 with respect to cone 20. Wheel 22 being driven by said cone normally rotates with its axis parallel to a plane extending through the axis of rotation of said cone. It may be tilted by movement of arm 44 and when so tilted will tend to be displaced along the surface of cone 20 until it again rotates with its axis parallel to said plane. The speed of rotation of wheel 22 is accordingly dependent on both the speed of rotation of cone 20 and upon the longitudinal position of wheel 22 with respect thereto.

Gear 34 of differential 32 is rotated at a speed proportional to that of wheel 22 and in a direction opposite to that in which gear 23 is rotated. Shaft 40 is accordingly operated by the differential mechanism at a speed proportional to the difference in speed between gears 33 and 34.

The parts are so adjusted that gears 33 and 34 are rotated at equal speeds and in the opposite directions when tilting wheel 22 is in a position corresponding to no load on the belt 10. As the load on said belt is increased, the free end of weighing beam 16 will be moved upwardly thereby moving arm 44 to the right and tilting wheel 22 to the position shown in Figs. 1 and 2. Further rotation of cone 20 will thereupon cause wheel 22 to travel along the surface of said cone until its axis again becomes parallel to its original position. Wheel 22 is then rotated at a speed in excess of its initial speed, causing an increase in speed of gear 34 and movement of shaft 40 proportional to said increase. The weight of the material conveyed is then entered upon integrating device 42. When the weighing beam 16 moves downwardly an inverse operation takes place.

By positioning cone 20 with its upper surface horizontal and wheel 22 in contact therewith, the friction of said wheel is determined by the weight of frame 25 and associated parts. This accordingly remains constant irrespective of the longitudinal position of said wheel and is not subject to change during the operating life of the apparatus.

In apparatus of this type, which is of value only as its operating characteristics are maintained constant, it is particularly important that the relationship between the two elements be subject to minimum change. Were springs or similar devices depended upon to effect the frictional contact between the cone and the tiltable wheel, this relationship would necessarily vary from time to time as a result of continued use of the apparatus and would result in errors in integration which would destroy the usefulness of the apparatus. But by effecting the contact by gravity, a force which is inherently constant, this source of error is removed. Whatever element of friction there is in frame 25 and associated parts remains constant throughout the life of the mechanism and hence does not affect the operative accuracy.

By enclosing the entire apparatus within a casing 50 it is possible to make the desired adjustments at the factory. In assembling the device it is then only necessary to attach said ribbon to the weighing beam 16. By positioning the cone with an axis extending at an angle of substantially 45° to the horizontal it is possible to connect the same by a direct drive through flexible cable 21 to a belt pulley 11 and also by flexible cable 37 to gear 35 which drives the negative side of the differential mechanism.

The use of a cone for the frictional driving element is an important feature of the invention. It is of course impossible in practice to drive tiltable wheel 22 by a theoretical point contact between its rim and the surface of the driving element. The contact necessarily extends over an appreciable area of surface. If the driving element were a flat surface, this area would be considerable, and would result not only in rapid wear on the contacting surfaces but also in sluggish response of the tiltable wheel to the tilting force, and consequent inaccuracy of the mechanism. But by utilizing a cone surface, as in this invention, the contact is made between two surfaces which curve away from each other, and consequently the area of contact is reduced to such an extent that wear is negligible while response of the tiltable wheel to the force actuating it is practically instantaneous. As a result a high degree of accuracy is obtained, and is maintained through prolonged use.

This application is a division of application Serial No. 326,825, filed December 18, 1928, entitled Scale mechanism.

While certain novel features of the invention have been shown and described and are pointed out in the annexed claims, it will be understood that various omissions, substitutions and changes in the forms and details of the device illustrated and in its operation may be made by those skilled in the art without departing from the spirit of the invention.

What is claimed is:

1. In an integrating mechanism, a friction cone, a wheel in frictional driving relation therewith, means to drive said cone in accordance with one of the quantities of the function to be integrated, means to cause said wheel to take a position on said cone corresponding to the instantaneous value of the other quantity of the function to be integrated, means for combining the rotations of said cone and said wheel to give the integrated function.

2. In an integrating mechanism, a cone, a contact wheel engaging said cone with the radius of said wheel which passes through the point of contact perpendicular to the element of the cone passing through the point of contact, a holder journalling said contact wheel, a horizontal guideway, a carriage on said guideway, means journalling said holder in said carriage so that the plane of said wheel may be rotated about said radius, means for rotating said cone under control of one of the quantities to be integrated, and means for rotating said holder through an angle determined by the instantaneous value of the other quantity to be integrated, and means for combining the rotation of said wheel and said cone to give the integrated amount.

3. In an integrating mechanism, a friction cone, a cooperating wheel in frictional driving relation therewith, the axis of said wheel having a normal position parallel to the element of the cone with which said wheel contacts, means controlled by the instanteous value of one of the quantities to be integrated for changing the plane of said wheel about a line intersecting the center of said wheel and perpendicular to its point of contact on said cone, means for driving said cone at a speed proportional to the other of the quantities to be integrated, whereby said wheel moves longitudinally of the cone until the angle of said wheel is turned back to normal, and means for combining the rotation of said cone and wheel to give the integrated amount.

4. In an integrating mechanism, a cone having its uppermost element horizontal, a contact wheel engaging said cone at said uppermost element, a holder journalling said contact wheel, means journalling said holder so that the plane of said wheel may be rotated about a radius of the wheel which intersects said uppermost element, means for so mounting said wheel that the weight thereof keeps the parts in contact, means for rotating said cone under control of one of the quantities to be integrated and means for rotating said holder through an angle determined by the instantaneous value of the other quantity to be integrated, and means for combining the rotation of said wheel and said cone to give the integrated amount.

5. In an integrating mechanism, a cone, a contact wheel engaging said cone, a holder journalling said contact wheel, means for journalling said holder so that the plane of said wheel may be rotated about a radius of the wheel which intersects said cone, means for so mounting said wheel and cone that the weight of one of said parts keeps the parts in contact, means for rotating said cone under control of one of the quantities to be integrated and means for rotating said holder through an angle determined by the instantaneous value of the other quantity to be integrated, and means for combining the rotation of said wheel and said cone to give the integrated amount.

6. In an integrating mechanism, a friction cone, means for journalling said cone so that the uppermost element thereof is horizontal, a contact wheel engaging said cone at the top thereof, a horizontal guideway above said cone, a carriage riding on said guideway, a holder, a bearing between said holder and carriage to journal said holder about a vertical axis, a contact wheel, means journalling said contact wheel on said holder, a belt pulley secured to said contract wheel, a long belt drum, means for journalling said drum parallel to the uppermost element of said cone, a belt on said belt pulley and drum, means to drive said cone at a speed proportional to one of the quantities to be integrated, means for rotating said holder about an angle proportional to the instantaneous value of the other quantity to be integrated, whereby the plane of said wheel is tilted and said wheel rides both circularly and longitudinal with respect to said cone, and means for combining the rotations of said cone and said drum to give the integrated amount.

7. In an integrating mechanism, a friction cone, means for journalling said cone so that the uppermost element thereof is horizontal, a contact wheel engaging said cone at the top thereof, a horizontal guideway above said cone, a carriage riding on the underside of said guideway, a holder, a large bearing surrounding said holder and located between said holder and carriage to journal said holder about a vertical axis, said contact wheel projecting through said holder, means journalling said contact wheel on said holder, a belt pulley secured to said contact wheel, a long belt drum, means for journalling said drum parallel to the uppermost element of said cone, a belt on said belt pulley and drum, means to drive said cone at a speed proportional to one of the quantities to be integrated, means for turning said holder about an angle proportional to the instantaneous value of the other quantity to be integrated, whereby the plane of said contact wheel is tilted and said wheel rides both circularly and longitudinally with respect to said cone, and means for combining the rotations of said cone and said drum to give the integrated amount.

HENRY J. STEHLI.